United States Patent [19]

Ryan et al.

[11] Patent Number: 5,468,330
[45] Date of Patent: Nov. 21, 1995

[54] APPARATUS FOR MANUFACTURING A DISPOSABLE VACUUM CLEANER BAG

[76] Inventors: Michael D. Ryan, P.O. Box 1686; Lowell H. Ryan, P.O. Box 823, both of Mattituck, N.Y. 11952

[21] Appl. No.: 270,122

[22] Filed: Jul. 1, 1994

[51] Int. Cl.⁶ .................. B01D 46/02; B32B 31/16
[52] U.S. Cl. .................. 156/443; 156/227; 156/461; 156/464; 156/466; 156/510; 55/DIG. 2; 493/243; 493/261; 493/924
[58] Field of Search .................. 156/227, 198, 156/269, 443, 459, 461, 464, 466, 270, 510, 513, 514; 493/924, 243, 246, 261, 453; 55/DIG. 2, 381, 382

[56] References Cited

U.S. PATENT DOCUMENTS

| | | | |
|---|---|---|---|
| 3,273,322 | 9/1966 | Fesco | 55/DIG. 2 |
| 3,333,523 | 8/1967 | Terzuoli | 55/DIG. 2 |
| 3,447,987 | 6/1969 | Williams | 156/227 |

*Primary Examiner*—Michele K. Yoder
*Attorney, Agent, or Firm*—Michael I. Kroll

[57] ABSTRACT

The present invention relates to an apparatus and method of manufacturing vacuum cleaner bags with a unique tri-lock top and bottom seal. The paper end of at the end of the open bag length is sealed onto itself with seam-paste glue three times providing an extra strong seam to accommodate the ever increasing air pressure created by today's powerful cleaners.

4 Claims, 3 Drawing Sheets

```
┌─────────────────────────────────────┐
│   PAPER FROM STOCK ROLL SECTION     │
│   TO PRINTING PRESS THEN FORMED     │
│ UTILIZING QUICK CHANGE ROTARY WHEELS│
└─────────────────────────────────────┘
                   │
┌─────────────────────────────────────┐
│    CUTTING PAPER IN A ROTARY        │
│     FASHION MOVING CUT BAG          │
│       LENGTHS FROM CUTTER           │
│     TO TRI - FOLD IN FORWARDING     │
│          ROLLER SECTION             │
└─────────────────────────────────────┘
                   │
┌─────────────────────────────────────┐
│     FOLDING AND GLUING ENDS         │
│    OF BAG A MINIMUM OF THREE        │
│  TIMES USING ONE TRI-FOLD CYLINDER  │
└─────────────────────────────────────┘
                   │
┌─────────────────────────────────────┐
│   TURNING BAG OVER END TO           │
│   END SO THAT OPPOSITE END          │
│   MAY BE FOLDED AND SEALED          │
│      IN TURN AROUND SECTION         │
└─────────────────────────────────────┘
                   │
┌─────────────────────────────────────┐
│     FOLDING AND GLUING THE          │
│     OPPOSITE ENDS OF BAG A          │
│     MINIMUM OF THREE TIMES          │
│    USING ONE TRI-FOLD CYLINDER      │
└─────────────────────────────────────┘
                   │
┌─────────────────────────────────────┐
│        TO CONVEYOR FOR              │
│  AUTOMATICALLY LOCATING AND         │
│   GLUING COLLARS ONTO BAGS          │
│    TO CONVEYOR STACKING             │
│   BAGS ONTO SHINGLE TABLE           │
└─────────────────────────────────────┘
```

FIG. 3

APPARATUS FOR MANUFACTURING A DISPOSABLE VACUUM CLEANER BAG

BACKGROUND OF THE INVENTION

1. Field of the Invention

This invention relates generally to vacuum cleaner filter bags and more particularly to a reinforced vacuum cleaner filter bag as well as a method of making same.

This invention relates to a disposable vacuum cleaner bag for use with top loading upright vacuum cleaners and a fully automated method for forming such bags.

2. Description of the Prior Art

Vacuum cleaner filter bags are typically formed from a blank which contains fold lines and cut-outs. The blank is folded on the specified lines and adhesive is applied during the course of the folding process whereby the filter bag is completed. Typically, such filter bags are folded into a tubular shape having closed ends with access means formed in the tubular bag for permitting passage of air into the interior of the bag so that air can be filtered.

The specific structure of the bag may vary depending upon the type of vacuum cleaner being utilized. For example, one typical filter bag is in the shape of a conventional page bag having a folded over edge on one end thereof and a bag bottom at the other end thereof. An opening is formed in the bag bottom which serves as the access means to permit the entry of air into the interior of the bag. The opening can then be connected to the vacuum cleaner outlet. Such a vacuum cleaner filter bag is described in U.S. Pat. No. 3,404,515.

With the aforementioned bag, a blank sheet material is formed with the appropriate fold lines and cut-outs. Adhesive is placed along the longitudinal edge to permit formation of an overlapped seam and the sheet is folded around to form a tubular structure. Then, the bottom is formed by appropriately folding the material. After the material is folded partway during the formation of the bottom, glue is applied in stripes and the material is then folded over to complete formation of the bottom. Transverse stripes of glue are then applied at the other end and the tubular material is folded onto itself to close off and seal the other end.

Another type of filter bag structure is the type having a long tubular body with both the upper and lower ends closed off by folding onto itself. An opening is formed in the tubular material and a separate connecting tube having an opening registered with the opening in the tubular body is connected. The connecting tube has its remote end available for connection to the vacuum cleaner outlet and the connecting tube serves as a passageway for the air into the filter bag.

This type of vacuum cleaner filter bag is described in U.S. Pat. No. 3,350,859 and wherein longitudinal fold lines are formed on the blank and the blank is folded around to form a tubular body having a front and rear panel and accordion side panels. Glue is provided in order to form an overlapping seam. Glue is also applied transversely at the upper and lower edges and the ends are then folded over onto itself to form a closed off cuff at the top and bottom portion. Adhesive is also placed around the registered openings to permit coupling of the connecting tube onto the tubular body. With both aforementioned types of vacuum cleaner filter bags, as well as with other types, although the filter bag is closed and appropriate adhesive is utilized for sealing and holding the bag closed, there is a tendency for rips and tears to occur at heavily stressed portions. Typically, tears will occur at the edges where the bag has been folded over in order to close off the bag. For example, at the folded over cuff portion, there will frequently occur tears or rips. Also, in the type of bag having a bottom, at the corners of the bottom, tears and rips tend to occur. Although additional adhesive can be applied, since the adhesive normally applied in stripes, it would necessitate applying a large amount of adhesive covering an excessive amount of area greater than the amount under stress. This would cause exposed adhesives which would be wet, tacky, and tend to stick to other adjacent bags during the course of processing.

Disposable vacuum cleaner bags have been made which are comprised of a tube portion which leads air and collected dust into another large air previous tube, or collection chamber. The tube portion may be made from an air pervious or air impervious material, while the collection chamber is of an air previous material. These bags are inserted into a cloth, vinyl, felt or other outer bag attached to a sweeper tank and, when full, the inner bag may be disposed of without dust problems associated with cleaners which do not use disposable bags.

Many upright cleaners which use such disposable bags are of a bottom loading design. Such bottom loading cleaners are disadvantageous in that the cleaner must force its air stream upwardly through previously collected dirt in the bag. In order to alleviate the problem, somewhat, with the bottom loading cleaners, vacuum cleaner bags have been developed which connect a transfer tube to the cleaner at a bottom connection, which transfer tube leads to a main collection bag compartment where the dirt is fed near the top and falls to the bottom of the collection compartment.

In U.S. Pat. No. 3,322,041, for example a bottom connection, but top loading design is shown, wherein the two sections are attached together only along the apertures which are formed in the two sections for passage of air flow from the transfer chamber to an air pervious or dust collection section. Such a design is an improvement over bottom loading design because a cleaner air stream does not have to flow through previously collected dirt. Prevalent top loading, but bottom connection, bag designs have a transfer tube which attaches to the dirt inlet duct of the vacuum cleaner near the bottom of the cleaner. The dirty air stream then blows up the transfer tube and through a window area between the transfer tube and the collection bag and then falls down into the collection bag. There are, however, two fundamental problems associated with such a bag design. One is that there is a tendency for the flexible duct member in the cleaner itself to collapse and cause clogging; and, secondly, it is possible for the consumer to improperly attach the bag to the cleaner. Indeed, this occurs often and results in bag failure and cleaner malfunction. The improper attachment occurs when the consumer folds the transfer tube into a U-shape before installing the bag, thus placing the bag, into the carrier, upside down.

In an attempt to overcome these problems associated with a bottom connection but top loading and top connection cleaners. Bags designed for use with such top loading cleaners overcame the above described problems, but also have caused problems of their own. Such bags require a transfer tube which attaches to the cleaner inlet duct and leads from the top of the bag to the cooperating apertures in the transfer tube and another section or collection bag. In order to produce the bags on fully automated equipment, the transfer tube must extend the full length of the collection bag. Since the window is near the top of the transfer tube, the entire lower section of the transfer tube would pack with dirt before dirt would flow through the window into the collection bag. In order to overcome this problem, the use of a short closed end bag or transfer tube was proposed, in combination with the collection bag, with the closed end bag having a hole in one wall communicating with the aperture in the wall of the collection bag. Use of such bags however, still left a small pocket below the windows which would fill with dirt. A further problem with such a short bag transfer tube collection bag combination, however, is that such a configuration requires three separate production operations. In one operation, the main bag body or collection bag is produced on one machine; in a second operation, the transfer tube or short bag section is produce and limits its availability.

The present invention relates to a method of manufacturing an outer bag for an upright vacuum cleaner on an automatic assembly line whereby bag material, as well as zipper material, both in continuous rolls are fed into an assembly line wherein zipper lengths are sewn on opposite sides of the bag material, and the assembled product is cut in predetermined lengths whereby the separated bag is zipped together to form a tube. The tube is enclosed at one or both ends to form a finished upright vacuum cleaner outer bag assembly.

The prior art method of manufacturing an outer bag is performed by either cutting the bag material to specified sizes and shapes, and attaching a finished assembled zipper to the sides of the cut panel by sewing or dielectric sealing means thereby forming a tube to be closed on one or both ends. Another method of manufacturing an outer bag for an upright vacuum cleaner is to cut the bag material into panels of specified sizes and shapes. Thereafter, one half of the zipper is attached to opposite sides of the panel by sewing or dielectric sealing methods. Then the sides with the zipper halves attached are zipped together causing the assembly to form a form a tube to be closed on one or both ends to form a bag.

Either of the above prior art methods of manufacturing an outer bag with a zipper for an upright vacuum cleaner is slow and time consuming. Consequently, the present invention, which automatically feeds both bag and zipper material in long rolls, whereby a high speed production of vacuum cleaner outer bags with zipper type openings is accomplished. The present method of manufacturing vacuum cleaner outer bags includes the use of a double headed sewing machine to sew the left and right side zippers thereon simultaneously. Thereafter, the assembled product is then fed into a cutting press with an automatic incremental feed system which cuts the bottom of one panel and the top of the succeeding panel to Specified lengths and constitutes a marked improvement over the methods practiced by the prior art.

Numerous innovations for the manufacture of vacuum cleaner bags have been provided in the prior art that are described as follows. Even though these innovations may be suitable for the specific individual purposes to which they address, they differ from the present invention as hereinafter contrasted.

U.S. Pat. No. 5,009,633 shows an method of manufacturing the outer cloth bag for an upright vacuum cleaner in which the bag material of a predetermined width is unwound from a reel and fed through guides, material folders and a double headed sewing machine. At the same time zipper chains are fed from rolls on the right and left side of the moving bag material. The zippers are sewn on opposite side edges of the bag, the bag material is cut into predetermined sized panels, and thereafter the side edges of the panels are folded and the zipper halves zipped up to form a tube. At least one open end is closed to form a bag.

U.S. Pat. No. 4,512,788 vacuum cleaner bag for use with top loading vacuum cleaner has a first collection tube and a second transfer tube, the tubes having communicating apertures near the top thereof, with a thermoplastic coating on the inner walls of the second transfer tube which is fused together to seal the second transfer tube adjacent the lower wall of the aperture thereof, the top and bottom of the first tube and bottom of the second transfer tube adhesively sealed; and method for automatically forming the bags by superimposing the two tubes, adhesively securing them together, heat sealing the inner walls of the second transfer tube together, below the aperture, and closing the ends of the tubes.

U.S. Pat. No. 4,322,259 shows a vacuum cleaner filter bag formed from a blank including a sheet of air permeable filter paper, and which is folded to define a tubular container having closed ends with an access opening formed in the container for permitting the passage of air into the interior of the bag so that the air can be filtered. The bag is formed by folding the blank and applying adhesive material onto specific areas during the folding operation in order to form the bag. On the blank itself there is also pre-applied, by pre-printing or extruding, a heat, self-stick or pressure sensitive type of adhesive material on specified areas, these areas being susceptible to tears. After the bag is formed, it is passed through a heat or pressure applying station which activates the pre-printed or extruded adhesive material thereby providing reinforcement to the bag at the areas which tend to tear.

U.S. Pat. No. 3,848,813 discloses a system in which urban waste, such as that collected from households in urban areas, is processed in the dry "as collected" state to recover ferrous metals, nonferrous metals, glass and paper fractions of suitable quality for sale and recycling. Waste is first shredded without balling or crushing tin cans and is thereafter subjected to a series of separations based upon differences in the physical properties of the waste materials.

U.S. Pat. No. 5,078,668 discloses is a method of making garment protector that is of high quality, having an envelope structure made of cloth fabric with an easy access opening in one of its sides covered by a flap member.

U.S. Pat. No. 4,322,259 discloses a vacuum cleaner filter bag formed from a blank including a sheet of air permeable filter paper, and which is folded to define a tubular container having closed ends with an access opening formed in the container for permitting the passage of air into the interior of the bag so that the air can be filtered. The bag is formed by folding the blank and applying adhesive material onto specific areas during the folding operation in order to form the bag. On the blank itself there is also pre-applied, by pre-printing or extruding, a heat, self-stick or pressure sensitive type of adhesive material on specified areas, these areas being susceptible to tears. After the bag is formed, it is passed through a heat or pressure applying station which activates the pre-printed or extruded adhesive material thereby providing reinforcement to the bag at the areas which tend to tear.

Numerous innovations for the manufacture of vacuum cleaner bags have been provided in the prior art that are adapted to be used. Even though these innovations may be suitable for the specific individual purposes to which they address, they would not be suitable for the purposes of the present invention as heretofore described.

SUMMARY OF THE INVENTION

The present invention is for a specific apparatus and method of manufacturing vacuum cleaner bags. The apparatus and method prints, forms, cuts, folds, glues, finishes, and packages bags all in one line on a single machine in continuous operation. The apparatus has two custom designed aluminum segment folding cylinders, each completing a triple fold glued seal at the end of the bag with one folding cylinder. An adjustable rotary wheel forms with quick change mount and dismount. The bag length is altered by changing gear at feed rollers. The linear mounted shaft driven direct drive motor is placed in line with the apparatus as well as inboard drive shafts, gear boxes and torque limiter at motor unlike conventional bag manufacturing machinery having motor mounted transversely to machine with belt or chain drive.

It is an object of the present invention to provide a novel vacuum cleaner bag for use with top loading upright vacuum cleaners.

It is another object of this present invention to provide a fully automated method for producing vacuum cleaner bags for use with top loading upright vacuum cleaners.

A vacuum cleaner bag for use with top loading upright vacuum cleaners comprises a first collection tube having closed ends and an aperture in a wall thereof, near top of collection tube, to serve as a collection bag, and a second narrower transfer tube having an aperture communication with the aperture of the first collection tube, serving as a feed tube. The second transfer tube has an open top end and a coating of thermoplastic material along the inner wall, at least adjacent the lower end of the aperture therein, and preferably completely over the inner wall, and a seal is formed between the inner walls of the second transfer tube by fusion of the thermoplastic material immediately below the aperture. The second transfer tube preferably extends the full length of the first collection tube and the bottom of the first collection tube to form a common closed end.

The bags are formed on automated equipment by bring the first and second tubes together, with the apertures aligned with each other, adhesively securing the tubes together and sealing the second tube, which has the inner coating of thermoplastic material, immediately below the aperture therein by application of heat and pressure to fuse the thermoplastic coating together. The top of the first tube is then adhesively closed by folding, and the bottom of the first and second tube preferably closed together by applying adhesive and folding of the same.

Accordingly, it is an object of the present invention to provide a vacuum cleaner filter bag which avoids the aforementioned problems of prior art filter bags.

Another object of the present invention is to provide a reinforced vacuum cleaner filter bag.

Still another object of the present invention is to provide a vacuum cleaner filter bag having pre-printed or extruded adhesive areas which are provided in locations which are tend to tear, and accordingly, provide reinforcement to the filter bag.

Yet another object of the present invention is to provide a vacuum cleaner filter bag formed from a blank of air permeable filter sheet material which includes pre-printed or extruded heat, self-stick or pressure sensitive adhesives in specified areas which are susceptible to tears and rips, and accordingly, provides reinforcement to the filter bag.

A further object of the present invention is to provide a vacuum cleaner filter bag formed by a blank of air permeable sheet material which includes a first type of adhesive utilized during the course of the folding and sealing operations and a second type of adhesive which is pre-printed or extruded onto the blank and is heat, self-stick or pressure sensitive.

Another object of the present invention is to provide a vacuum cleaner filter bag formed from a blank of sheet material which utilizes quick setting, slow drying resin adhesive during the course of the folding and forming of the bag, as well as a heat, self-stick or pressure sensitive adhesive pre-printed or extruded on the blank for reinforcing specified areas of the filter bag.

Another object of the present invention is to provide a blank for a vacuum cleaner filter bag having appropriate fold lines and cut-outs for forming the bag, and including pre-printed or extruded adhesive material on specified area of the blank.

Still another object of the present invention is to provide a method of manufacturing a reinforced vacuum cleaner filter bag.

A further object of the present invention is to provide a method of manufacturing a vacuum cleaner filter bag by utilizing a blank having pre-printed or extruded heat, self-stick or pressure sensitive adhesive areas on specified locations and by applying heat or pressure onto the filter bag after it is folded and sealed into its final form.

Briefly, in accordance with the present invention, there is provided a vacuum cleaner filter bag which is formed from a blank of air permeable filter sheet material which is folded to define a tubular bag having closed ends. An excess means is formed in the tubular bag for permitting passage of the air to be filtered into the interior of the bag. A first adhesive material is applied onto specific areas of the blank for sealing the bag in its folded condition. A second, heat, self-stick or pressure sensitive adhesive material is pre-printer extruded onto the blank in other specified areas, and specifically adjacent to the ends, in order to prevent tears at the closed ends and provide reinforcement to the bags.

The present invention also contemplates a blank for a vacuum cleaner filter bag, comprising a sheet of air permeable filter material which is provided with a pair of transverse edges and a plurality of elongated fold lines for defining therebetween a front panel, side panel,and a rear panel, when the blank is folded thereon. A cut-out section is formed on the blank for forming access means into the filter bag when it is folded. A heat, self-stick or pressure sensitive adhesive material is pre-printed or extruded in stripes on the blank adjacent the transverse edges for preventing tears at the edges of the bag, when it is in a folded condition.

The invention also contemplates a method of manufacturing a vacuum cleaner filter bag comprising the steps of forming a blank air permeable filter material, having the necessary fold lines and cut-outs which are needed to form the desired filter bag configuration. A heat, self-stick or pressure sensitive adhesive material is printed or extruded onto the blank in specified areas which are susceptible to tears. The bag is folded and glued into its final form utilizing additional adhesives disposed on the other areas as needed. Heat or pressure is then applied to the folded filter bag in order to activate the heat, self-stick or pressure sensitive adhesive material, thereby providing g the extra reinforcement to the filter bag.

The novel features which are considered characteristic for the invention are set forth in the appended claims. The invention itself, however, both as to its construction and its method of operation, together with additional objects and advantages thereof, will be best understood from the following description of the specific embodiments when read and understood in connection with the accompanying drawing.

BRIEF LIST OF REFERENCE NUMERALS UTILIZED IN THE DRAWING

6—shingle table 6
8—collar section 8
10—vacuum bag manufacturing equipment conveyor 10
14—second tri-fold section 14
16—turn around section 16
18—first tri-fold section 18
20—forwarding section 20
22—rotary cutter 22
24—motor and drive train 24
26—quick change former section 26
28—print press section 28
30—paper roll 30

DETAILED DESCRIPTION OF THE LIST OF REFERENCE NUMERALS UTILIZED IN THE DRAWING

6—shingle table 6 stacks finished vacuum cleaner bags and receives processed vacuum cleaner bag material from collar section 8

8—collar section 8 automatically locates and glues collars onto processed vacuum cleaner bags and receives processed vacuum cleaner bag material from conveyor 10

10—conveyor 10 receives processed vacuum cleaner bag material from second tri-fold section 14

14—second tri-fold section 14 folds and seals opposite end and receives processed vacuum cleaner bag material from turn around section 16

16—turn around section 16 turns bag over end to end so that opposite end may be folded and sealed and receives processed vacuum cleaner bag material from first tri-fold section 18

18—first tri-fold section 18 folds and seals opposite ends and receives processed vacuum cleaner bag material from forwarding section 20

20—forwarding section 20 moves cut bag lengths from rotary cutter 22 to first tri-fold section 18

22—rotary cutter 22 cuts vacuum cleaner material bag material which is received from quick change former section 26 and moves cut bag material to forwarding section 24—motor and drive train 24 powers vacuum cleaner bag manufacturing apparatus 26—quick change former section 26 utilizing quick change rotary wheels receives processed vacuum cleaner bag material from print press section 28

28—print press section 28 receives vacuum cleaner bag material from paper roller 30 and feeds said vacuum cleaner bag material to quick change former section 26 after printing 30—paper roller 30 feeds vacuum cleaner bag material to print press section 28

BRIEF DESCRIPTION OF THE DRAWINGS

FIG. 3 is a detailed flow diagram representing the method by which vacuum cleaner bags are manufactured

DETAILED DESCRIPTION OF THE PREFERRED EMBODIMENT

Figure 1:
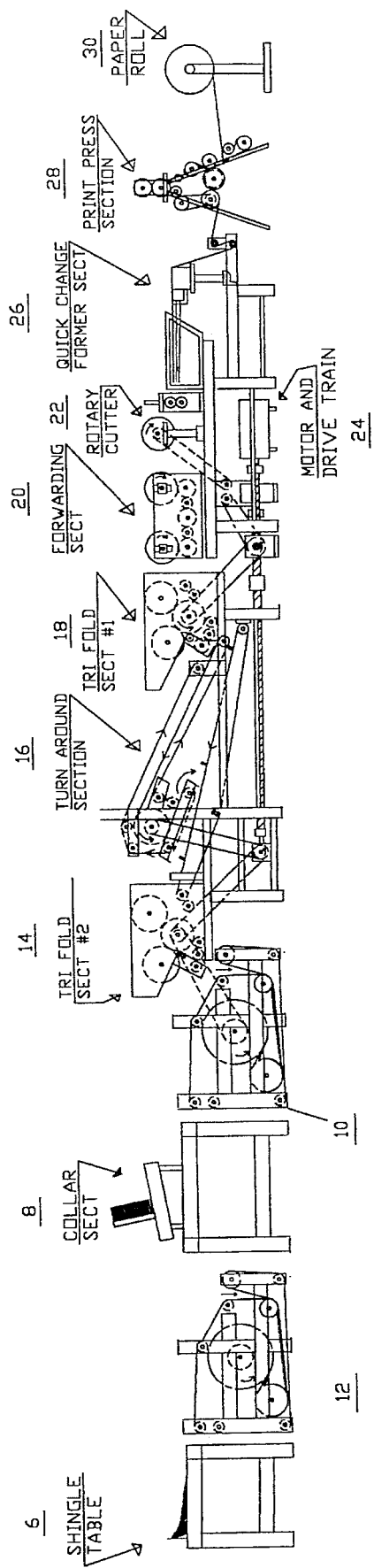
FIG. 1 is a diagrammatic representation of the vacuum cleaner bag manufacturing apparatus

Firstly, referring to FIG. 1 which is a diagrammatic representation of the vacuum cleaner bag manufacturing apparatus exhibiting the following features: shingle table 6 stacks finished vacuum cleaner bags and receives processed vacuum cleaner bag material from collar section 8; collar section 8 automatically locates and glues collars onto processed vacuum cleaner bags and receives processed vacuum cleaner bag material from conveyor 10; conveyor 10 receives processed vacuum cleaner bag material from second tri-fold section 14; second tri-fold section 14 folds and seals opposite end and receives processed vacuum cleaner bag material from turn around section 16; turn around section 16 turns bag over end to end so that opposite end may be folded and sealed and receives processed vacuum cleaner bag material from first tri-fold section 18; first tri-fold section 18 folds and seals one end and receives processed vacuum cleaner bag material from forwarding section 20; forwarding section 20 moves cut bag lengths from rotary cutter 22 to first tri-fold section 18; rotary cutter 22 cuts vacuum cleaner material bag material which is received from quick change former section 26 and moves cut bag material to forwarding section; motor and drive train 24 powers vacuum cleaner bag manufacturing apparatus; quick change former section 26 utilizing quick change rotary wheels receives processed vacuum cleaner bag material from print press section 28; print press section 28 receives vacuum cleaner bag material from paper roller 30 and feeds said vacuum cleaner bag material to quick change former section 26 after printing; and paper roller 30 feeds vacuum cleaner bag material to print press section 28.

Figure 2:
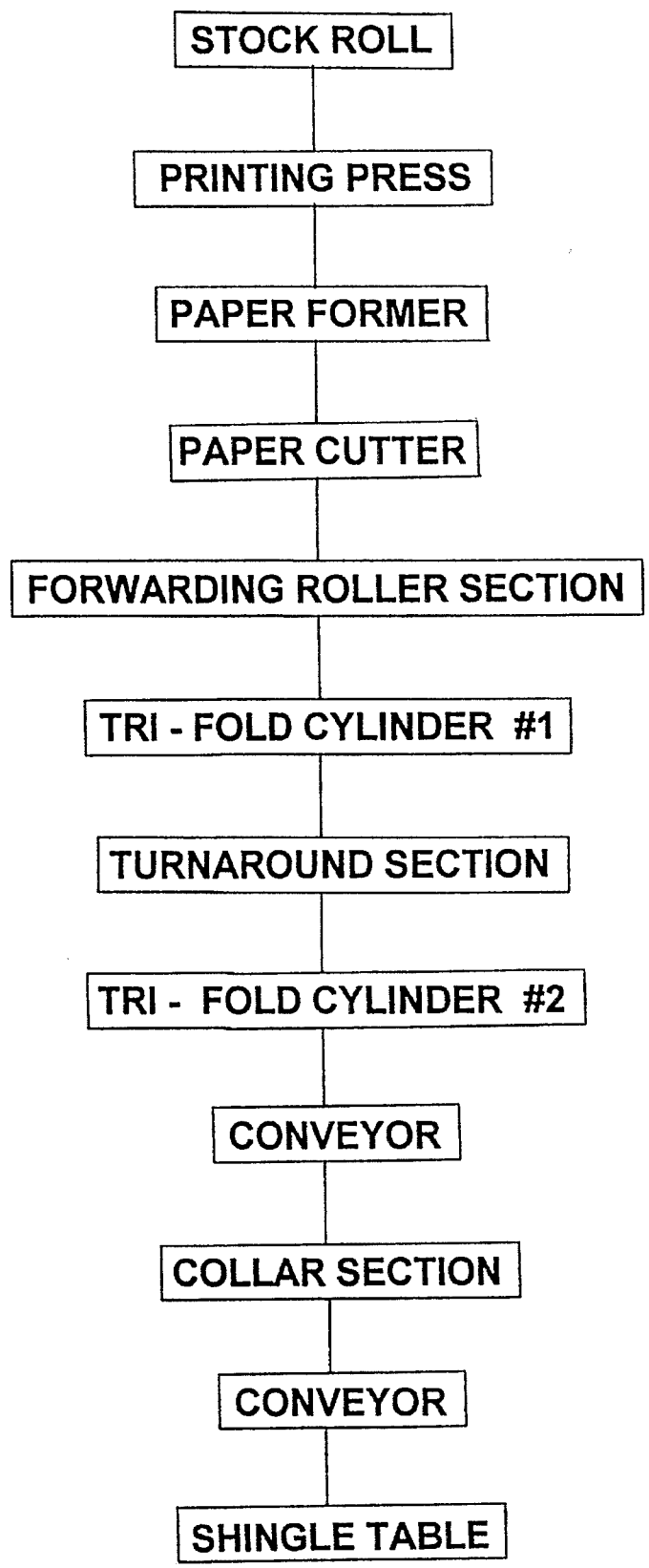
FIG. 2 is flow diagram representing the method by which vacuum cleaner bags are manufactured

Now referring to FIG. 2 which is flow diagram representing the individual parts of the apparatus by which vacuum cleaner bags are manufactured exhibiting the following parts: stock paper roll; printing press; paper former; paper cutter; forwarding roller section; first tri-fold cylinder; turn around section; second tri-fold section; conveyor; collar section conveyor; and shingle table.

Now referring to FIG. 3 which is a detailed flow diagram representing the method by which vacuum cleaner bags are manufactured exhibiting the following steps:

a) forming vacuum cleaner bag material from paper stock roll;

b) moving formed vacuum cleaner bag material to printing press then through former section utilizing quick change rotary wheels;

c) cutting vacuum cleaner bag material in a rotary fashion;

d) moving cut vacuum cleaner bag material to tri-fold in forwarding roller section;

e) folding and gluing ends of formed and cut vacuum cleaner bag material using tri-fold cylinder;

f) turning bag over end to end so that opposite end may be folded and sealed in turn around section in second tri-fold section;

g) automatically locating and gluing collars through conveyor to collar section onto bags and feeding said bags onto shingle table for stacking purposes.

It will be understood that each of the elements described above, or two or more together, may also find a useful application in other types of constructions differing from the type described above.

While the invention has been illustrated and described as embodied in an apparatus and method of manufacturing, it is not intended to be limited to the details shown, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. A vacuum cleaner bag manufacturing apparatus comprising:
   a) a shingle table upon which stacks finished vacuum cleaner bags which are received from a collar section;
   b) at least one collar section which automatically locates and glues collars onto processed vacuum cleaner bags and receives processed vacuum cleaner bag material from a conveyor;
   c) at least one conveyor which receives processed vacuum cleaner bag material from a second tri-fold section;
   d) a first tri-fold section which folds and seals one end and receives processed vacuum cleaner bag material from a forwarding section;
   e) a second tri-fold section which folds and seals opposite ends and receives processed vacuum cleaner bag material from a turn around section;
   f) a turn around section which turns bag over end to end so that opposite ends may be folded and sealed and receives processed vacuum cleaner bag material from said first tri-fold section;
   g) a forwarding section moves cut bag lengths from a rotary cutter to said first tri-fold section;
   h) a rotary cutter cuts vacuum cleaner material bag material which is received from a quick change former section and moves cut bag material to said forwarding section;
   i) at least one motor and drive train which powers said vacuum cleaner bag manufacturing apparatus;
   j) a quick change former section utilizing quick change rotary wheels which receives processed vacuum cleaner bag material from a print press section;
   k) a print press section which receives vacuum cleaner bag material from a paper roller and feeds said vacuum cleaner bag material to said quick change former section after printing on said material; and
   l) a paper roller which feeds vacuum cleaner bag material to said print press section.

2. A vacuum cleaner bag manufacturing apparatus as described in claim 1, wherein said apparatus is capable of handling paper, plastic, and recyclable organic material.

3. A vacuum cleaner bag manufacturing apparatus as described in claim 1, wherein said apparatus is all in one line on a single apparatus in continuous operation.

4. A vacuum cleaner bag manufacturing apparatus as described in claim 1, wherein said first and second tri-fold sections comprise at least two custom designed aluminum segment folding cylinders, each completing a triple fold glued seal at the end of a bag with one folding cylinder.

* * * * *